United States Patent
Goktekin

(10) Patent No.: US 10,523,807 B2
(45) Date of Patent: *Dec. 31, 2019

(54) METHOD FOR CONVERTING CHARACTER TEXT MESSAGES TO AUDIO FILES WITH RESPECTIVE TITLES DETERMINED USING THE TEXT MESSAGE WORD ATTRIBUTES FOR THEIR SELECTION AND READING ALOUD WITH MOBILE DEVICES

(71) Applicant: Nuance Communications, Inc., Burlington, MA (US)

(72) Inventor: Cuneyt Goktekin, Potsdam (DE)

(73) Assignee: Cerence Operating Company, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/637,950

(22) Filed: Jun. 29, 2017

(65) Prior Publication Data

US 2017/0366660 A1 Dec. 21, 2017

Related U.S. Application Data

(63) Continuation of application No. 13/372,524, filed on Feb. 14, 2012, now Pat. No. 9,699,297.

(30) Foreign Application Priority Data

Feb. 19, 2011 (EP) ...................................... 11155115

(51) Int. Cl.
*G10L 13/00* (2006.01)
*G06F 17/28* (2006.01)
(Continued)

(52) U.S. Cl.
CPC ......... *H04M 1/72552* (2013.01); *G10L 13/08* (2013.01); *H04L 51/066* (2013.01);
(Continued)

(58) Field of Classification Search
CPC ..... G10L 13/08; G06F 17/289; G06F 17/2264
(Continued)

(56) References Cited

U.S. PATENT DOCUMENTS 6,874,018 B2   3/2005  Wu
8,904,267 B2 * 12/2014 Mewherter ......... G06F 17/2264
                                                    715/200
(Continued)

FOREIGN PATENT DOCUMENTS

GB         2445279 A      7/2008
WO      2008091727 A1    7/2008

OTHER PUBLICATIONS

Non-Final Office Action for U.S. Appl. No. 13/372,524 "Method for Converting Character Text Messages to Audio Files With Respective Titles for Their Selection and Reading Aloud With Mobile Devices," dated Jun. 4, 2015.
(Continued)

*Primary Examiner* — Farzad Kazeminezhad
(74) *Attorney, Agent, or Firm* — Ohlandt, Greeley, Ruggiero & Perle, L.L.P.

(57) ABSTRACT

The present invention relates to a method for selecting and downloading content from a content provider which is accessible via an IP/DNS/URL address to a mobile device, the content being any text information data, for converting the text information data to at least one audio message and for storing the at least one audio message as at least one audio file on the mobile device, wherein the at least one audio file is playable and discernable as a music file. Said method implemented on a mobile phone enables controlling and playing the audio messages as music files by determining a title associated with the audio message using word underline and size attributes of the text, for user selection on the mobile's graphical user interface, for instance also in a car environment with a car kit enabling a control and a selection of one or more of said at least one audio files for playing from the mobile phone.

16 Claims, 11 Drawing Sheets

(51) Int. Cl.
  *H04M 1/725* (2006.01)
  *G10L 13/08* (2013.01)
  *H04L 12/58* (2006.01)
  *H04B 1/08* (2006.01)
  *H04M 1/60* (2006.01)

(52) U.S. Cl.
  CPC ............ *G06F 17/289* (2013.01); *H04B 1/082* (2013.01); *H04L 51/38* (2013.01); *H04M 1/6075* (2013.01)

(58) Field of Classification Search
  USPC ..................................................... 704/260, 3
  See application file for complete search history.

(56) References Cited

U.S. PATENT DOCUMENTS

| | | | |
|---|---|---|---|
| 9,699,297 | B2 | 7/2017 | Goktekin |
| 2008/0059189 | A1 | 3/2008 | Stephens |
| 2008/0085689 | A1 | 4/2008 | Zellner |
| 2009/0075624 | A1 | 3/2009 | Cox et al. |
| 2010/0036731 | A1 | 2/2010 | Vieri |
| 2010/0228549 | A1 | 9/2010 | Herman et al. |
| 2010/0293190 | A1 | 11/2010 | Kaiser et al. |
| 2010/0305807 | A1 | 12/2010 | Basir et al. |
| 2012/0030015 | A1 | 2/2012 | Brunsman et al. |

OTHER PUBLICATIONS

Final Office Action for U.S. Appl. No. 13/372,524 "Method for Converting Character Text Messages to Audio Files With Respective Titles for Their Selection and Reading Aloud With Mobile Devices," dated Nov. 30, 2015.

Non-Final Office Action for U.S. Appl. No. 13/372,524 "Method for Converting Character Text Messages to Audio Files With Respective Titles for Their Selection and Reading Aloud With Mobile Devices," dated Oct. 18, 2016.

Notice of Allowance for U.S. Appl. No. 13/372,524 "Method for Converting Character Text Messages to Audio Files With Respective Titles for Their Selection and Reading Aloud With Mobile Devices," dated Mar. 7, 2017.

* cited by examiner

```
:!DOCTYPE html PUBLIC "-//W3C//DTD HTML 4.01 Transitional//EN"
"http://www.w3.org/TR/html4/loose.dtd">
:!--[if IE]><![endif]-->
<html>
:head>
title>The New York Times - Breaking News, World News &
Multimedia</title>
:meta name="robots" content="noarchive,noodp,noydir">
:meta name="description" content="Find breaking news, multimedia, reviews
& opinion on Washington, business, sports, movies, travel, books, jobs,
education, real estate, cars & more.">
:meta name="keywords" content="United States International
Relations,Egypt,Demonstrations, Protests, and Riots, International
Relations,Mubarak, Hosni,News and News Media,Egypt,Freedom of the
Press,Middle East,Mubarak, Hosni,Egypt,Demonstrations, Protests, and
Riots,Saleh, Ali Abdullah,Yemen,Demonstrations, Protests, and
Riots,International Relations,Egypt,Republican Party,United States
International Relations,Bloomberg, Michael R,New York City,Pensions and
Retirement Plans, Democratic Party, Law and Legislation, Federal Budget
(US),Economic Conditions and Trends,Republican Party,Budgets and
Budgeting,Health Insurance and Managed Care,Tucson Shooting
(2011),Awards, Decorations and Honors,Presidents and Presidency
(US),Reagan, Ronald Wilson,Republican Party,Weather,Snow and
Snowstorms,Epidemics,Medicine and Health,Children and Youth, Swine
Influenza,Wen Jiabao,Grain,Hu Jintao,Drought,Food,Wheat,China,Health
Insurance and Managed Care, Law and Legislation,Medicine and
Health, Preventive Medicine, Pregnancy and Obstetrics,Patient Protection and
Affordable Care Act (2010),Birth Control and Family Planning, Law and
Legislation, Regulation and Deregulation of Industry,Senate,Health Insurance
and Managed Care,United States Politics and Government,Patient Protection
and Affordable Care Act (2010),House of Representatives,Bush, George
W,United States Defense and Military Forces,Rumsfeld, Donald H,Iraq War
(2003- ),Football,Super Bowl,Rooney, Dan,Tomlin, Mike, Rooney, Art
II,Pittsburgh Steelers">
:meta name="CG" content="Homepage">
:meta name="SCG" content="">
:meta name="PT" content="Homepage">
:meta name="PST" content="">
:meta name="HOMEPAGE_TEMPLATE_VERSION" content="300">
:link rel="alternate" type="application/rss+xml" title="RSS"
href="http://www.nytimes.com/services/xml/rss/nyt/HomePage.xml">
:link rel="alternate" media="handheld" href="http://mobile.nytimes.com">
:link rel="stylesheet" type="text/css"
```

Fig. 4a

METHOD FOR CONVERTING CHARACTER TEXT MESSAGES TO AUDIO FILES WITH RESPECTIVE TITLES DETERMINED USING THE TEXT MESSAGE WORD ATTRIBUTES FOR THEIR SELECTION AND READING ALOUD WITH MOBILE DEVICES

RELATED APPLICATION(S)

This application is a continuation of U.S. application Ser. No. 13/372,524, filed Feb. 14, 2012, which claims priority under 35 U.S.C. § 119 or 365 to European Application No. 11155115.6, filed Feb. 19, 2011. The entire teachings of the above application(s) are incorporated herein by reference.

The present invention relates to a method for downloading content containing one or more text messages as preferably emails, SMS messages, instant messages, social network feeds or news from one or more web addresses, for converting the text messages to one or more audio messages and for storing the one or more audio messages together with a respective short title as one or more audio files on a mobile device. The mobile device is preferably a smart-phone, a music player, a car infotainment system or the like comprising means for the storing and preferably playing the audio files and music data files, respectively. The storing of the audio files is preferably done in a standard audio or music data file format, such that the audio files can become displayed by their short titles and selected and played the same way as the music data files.

In case the mobile device is connected to the car infotainment system a car driver can preferably have a look at the titles of the audio files on a display screen of the car infotainment system and select and play the audio files therewith. An incoming new text message as preferably one of the emails, the SMS messages, the instant messages, the social network feeds and the news gets preferably downloaded and converted by the mobile device to the respective audio message, stored as the respective audio file and read aloud upon its selection by the user.

Furthermore the present invention relates to a method which preferably recognizes and extracts the text messages within the downloaded content, generates respective headlines to the text messages and generates respective short titles as file names for the audio files.

A currently announced car infotainment system "ConnectedDrive Assist" from BMW provides a displaying of the emails on a Blackberry smart-phone and their selection and reading aloud. Said system requires a Bluetooth connection to the mobile device being the Blackberry. Within the display screen of the ConnectedDrive Assist the emails are selectable and readable as text as well as the emails can also become selected and read aloud. Said car infotainment system fitting to only some of the BMW car models and to very few mobile devices is very expensive because of big software development effort and limited sales for said car models and mobile devices. Said car infotainment system with said functionality is not a standard compared for example to lots of car infotainment or radio systems with interface to music players as e.g. iPhones, iPods, and other more simple MP3 players.

Another similar car infotainment system is for example "Media Interface Plus" from Mercedes Benz.

The difficulty having remote control access to the emails and the SMS on the mobile devices is related to proprietary and often secret interface protocols of the mobile devices, if they have any of such remote control access possibility at all.

An adaptation of the car infotainment system to one of the mobile devices is made either by a hardware data connection cable, in some cases by an additional holder/cradle for the mobile phone or by a wireless data connection in combination with a communication software running on the car infotainment system, in some cases on the holder/cradle and on the mobile device. Some systems require also a download of application software onto the mobile device. Some of the holder/cradles for the mobile phones comprise a processor with software for interface protocol conversion in order to establish a proper communication between the mobile phone and the car infotainment system.

In some cases the selection of the email and the reading it aloud can be even controlled by steering wheel buttons which are connected to the infotainment system by a CAN bus or the like or by speech control. Upon the selection of the email for reading it aloud, the text message gets converted by a Text-to-Speech (TTS) software to an audio message which is output via the loudspeakers of the infotainment system. The TTS software runs on the infotainment system.

Other infotainment systems download upon connection to the smart-phone the email and SMS data instantly and display a number of them by the respective title or sender address on the display screen of the infotainment systems for the selection as described above.

Another system called iLane of the company Intelligent Mechatronic Systems Inc. connects via Bluetooth to the smart-phone and as well to a Bluetooth hands-free car kit with control buttons and/or speech control and with an audio output. The iLane system comprises on board the TTS software for the conversion of the text messages to the audio message, for outputting status messages and questions and it comprises speech recognition software in order to provide communication with the driver recognizing control commands from the driver. For instance after having read the selected email aloud, the iLane system asks for a next control command. Such an instant demanded for voice control in an unforeseeable situation at the end of the read text message puts a sometimes big pressure on the driver and gets dangerous. For safety reasons a voice control for reading emails is not recommendable. Besides, said functionalities could also be part of software running on the mobile device itself using TTS software and the folder or playlist or the like in combination with all the play/stop functionalities of its music player. Thus an additional hardware and cost for the hardware and the installation could be avoided.

US 2010 0 305 807 A1 discloses a similar communication system to the iLane system, the communication system comprising a control unit being fixedly installed in a car and connected to a vehicle bus; and a mobile communication device connected to the control system preferably via a wireless Bluetooth connection, wherein the mobile communication device works as a long distance wireless gateway to a data network. Emails or SMS as text data get downloaded from an internet server, converted into audio data and output aloud in the car by a vehicle sound system or by a headset. However this system comprises a separate extra hardware being the control unit which needs to be installed in the car with all the necessary wiring.

WO 2008 091 727 A1 discloses a similar communication system to that of US 2010 0 305 807 A1, comprising also a control unit with a first interface to a mobile device being installed in the vehicle, wherein the control unit comprises a common application programming interface (API) for the application manager program.

Apart from developing Bluetooth standards as e.g. MTP, A2DP and AVRCP profiles, all in all there is not yet a wired or wireless interface communication standard established in the market providing the selection and reading aloud the text messages, as the emails, the SMS and news, for instance, and extra software including a further menu structure had to be developed on car infotainment systems or the like which make the system immediately expensive again.

However remote controlling music players as an iPod, for instance, by current car infotainment systems is widely common and can be found for cars from Mercedes, BMW, AUDI, Porsche, Chrysler and others.

Information data as for instance news downloaded from web pages or even preselected news which are preselected by parsing and searching for certain keywords within lots of text pages and in documents can be stored as text files and become converted by the TTS software generating respective audio files. Said audio files can be stored on a PC in a format as the music data or as WAV audio file and thereupon be downloaded to the mobile device as. Thereupon the audio files could be played on the mobile device. However such a manual procedure is cumbersome and business people spending much time in a car and having a desire to listen to such information data would like to have such functionality as automated as possible. Furthermore an advantageous aspect would be using therefore the already available mobile device preferably in combination with the car infotainment system.

SUMMARY OF THE INVENTION

The object of the invention is to overcome the shortcomings explained above and to provide a method for receiving information data as e.g. an email, a SMS an instant message, and a social network feed, for recognizing at least one text message within the information data and for converting the at least one text message to at least one audio message and for storing the at least one audio message as at least one audio file with a descriptive file name on a mobile device.

Another preferred object of the invention is that said method further comprises a connection to one or more IP addresses of at least one content provider, a downloading of the respective content being the information data from the respective IP address, whereupon the text messages get recognized within the information data and converted to the at least one audio message and stored as the at least one audio file.

Another preferred object of the invention is that furthermore image data which contain the text message within the information data get converted to character text which is then further processed in order to obtain the at least one audio file.

Another preferred object of the present invention is to store the at least one audio file in a format as a standard music or audio file, in order to store the at least one audio file in an already existing folder, directory, data base structure or the like on a mobile device or music player, respectively.

Another preferred object is that said method can be implemented on standard smart-phones or music players as preferably on an iPhone or iPod or the like.

Another preferred object is that said audio files can be selected and read aloud remotely by a car infotainment system connected to the mobile devices or comprising its functionality.

The above objects as well as further objects which will become apparent from the following description are achieved by the features mentioned in the independent claim. Additional features and characteristics of the invention are mentioned in the dependent claims.

Further advantageous aspects of the invention are set out in the following detailed description. The invention is set forth and characterized in the main claim, while dependent claims describe other advantageous characteristics of the invention.

One solution of a preferred embodiment according to the present invention is disclosed in the following drawings with detailed description but it shall not be limiting the invention.

BRIEF DESCRIPTION OF THE DRAWINGS

FIG. 4*a* shows downloaded content of a web page under a certain IP address, the content being information data.

DETAILED DESCRIPTION OF A PREFERENTIAL METHOD ACCORDING TO THE INVENTION

Figure 1:
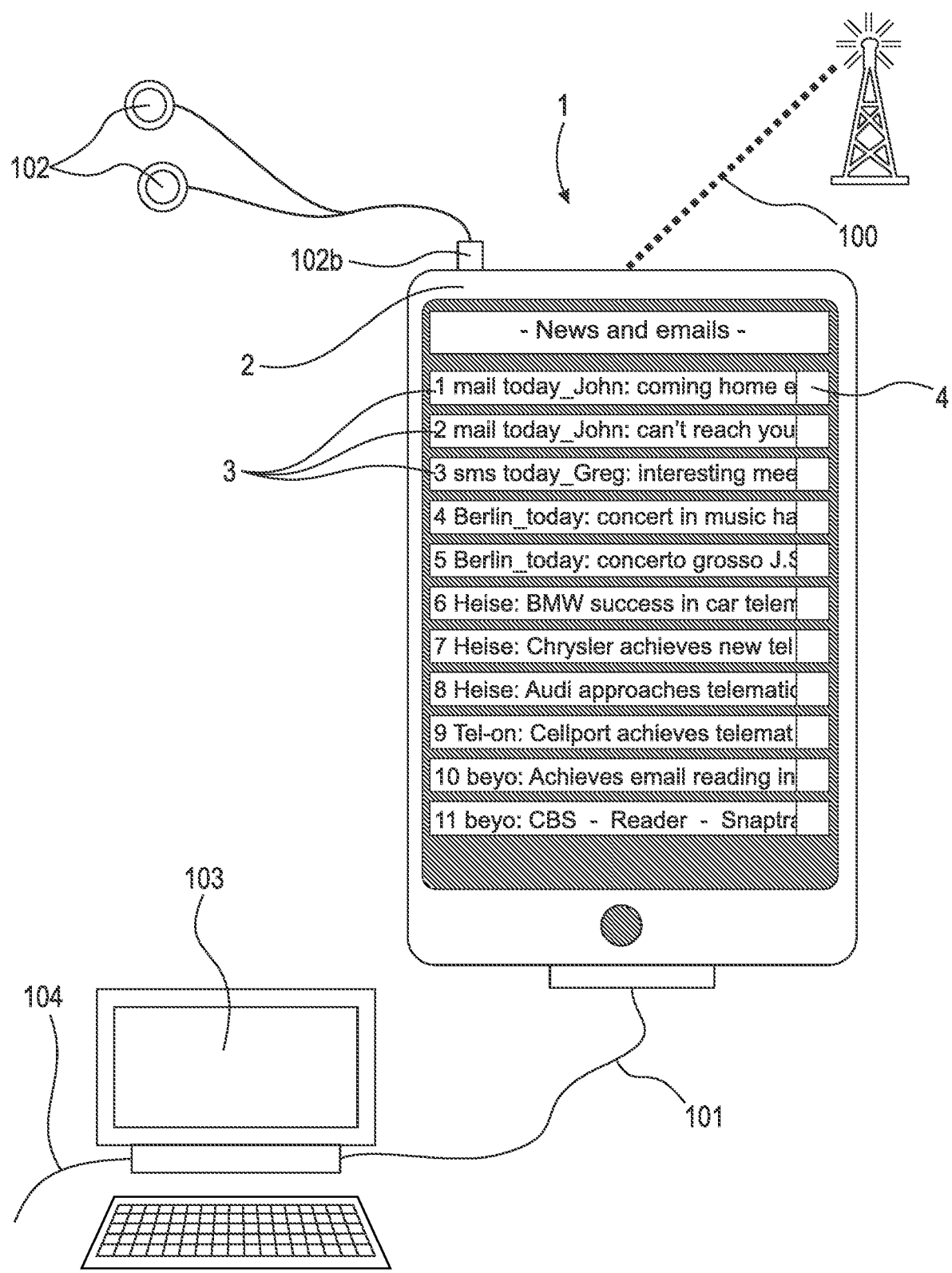
FIG. 1 shows a mobile device connected via a wireless Internet connection to a wireless base station and connected via a mobile device connection to a PC system also with Internet connection.

FIG. 1 shows a system overview, wherein a mobile device 1 is connected preferably via a wireless internet connection 100 to a base station which is preferably a GSM/GPRS/UMTS, a CDMA base station a WIFI station with connection to the internet or the like. On the other side. the mobile device 1 can be also connected via a mobile device connection 101 to a PC system 103 which is connected to an internet via an internet connection 104 being preferably a DSL connection, a WIFI connection to the internet or the like.

The mobile device 1 is running in a foreground in music player mode, iPod mode or the like and shows on its display a folder name 2 as "News and emails" and shows beneath multiple titles 3 of text messages 31-34 or audio files, respectively. The title 3 show in short words a content of the respective audio file, its generation date, its sender, a keyword, an enumeration or the like or parts thereof. The audio files can be music data files and/or audio messages obtained from the text messages 31-34 and can be selected and played by the mobile device 1 and listened to either by ear-plugs or by another audio system which is connected by an audio connector 102b to the mobile device 1.

Usually the text messages 31-34 being preferably emails, SMS, instant messages, social network feeds or news or other information data 10 get downloaded by the mobile device 1 from respective content providers and thereupon can be selected and read on the display of the mobile device 1 or in more rare cases on the display screen of a car infotainment system 105 connected to the mobile device 1.

According to the invention the text messages 31-34 being downloaded from the respective content provider as respective information data 10 get recognized and extracted as character text, a short title is generated which is taken as the respective file name for the text message, the character text is converted by text-to-speech software (TTS) to audio data or the respective audio message and stored as the respective audio file with the respective file name. Thus the text messages 31-34 can be selected and played in a music player mode on the mobile device 1 and read aloud either by the ear plugs 102 or by a connected audio system as a car infotainment system 105 or the like.

According to the present invention the text messages 31-34 contained in the downloaded information data 10 get converted to the one or more audio files and thereupon can be selected and played as the one or more audio messages either by control within the mobile device 1 or preferably by control through the car infotainment system 105. Preferably the selected one or more audio files or text messages 31-34, respectively, get read aloud via a car radio or the car infotainment system 105. Advantageously the driver is not forced after one of the read text messages 31-34 to react immediately by a calling for a voice command or for pushing a key or the like.

Common car infotainment systems 105 with an interface to the mobile device 1 for playing music and preferably even for displaying and selecting music titles 3 for a playing can be used to read the text messages 31-34 as emails, SMS, instant messages, social network feeds and downloaded news from one or more IP addresses 51 can be used to preferably select and read said text messages 31-34 to the driver. This prevents from making the driver nervous hearing for instance that a new email or SMS came in, perhaps containing important information, so that he tends to reach for the mobile device 1 and even to read the text message 31-34 while he is driving.

Figure 6A:
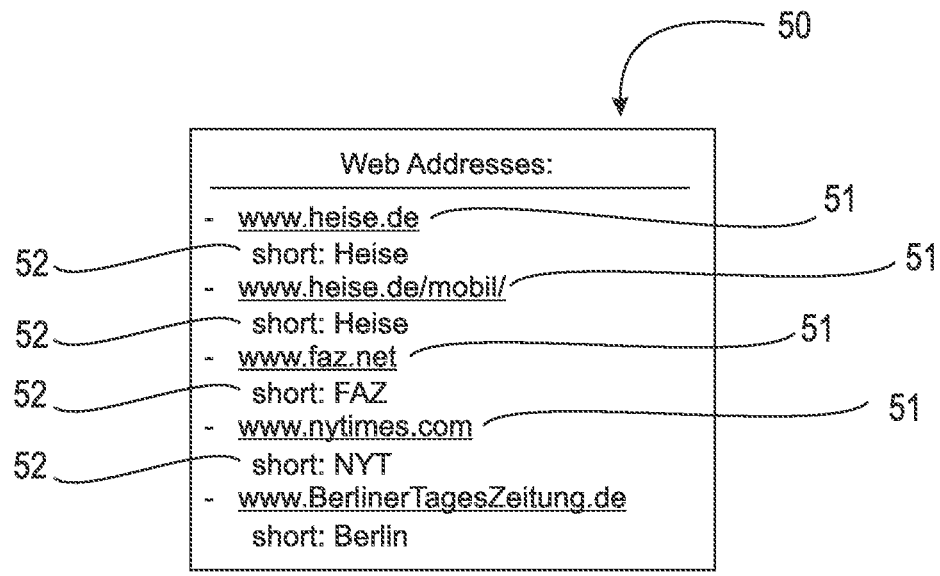
FIG. 6*a* shows an address table containing multiple IP addresses.

The example shown in the display of the mobile device 1 indicate the user that No. 1 and 2 are emails from that day, No. 3 is a SMS from that day, No. 4 and 5 are news from Berliner Zeitung which is abbreviated by Berlin, No. 6 to 8 are news from Heise online with some further detailed information and so forth. Preferably the abbreviations of news or of information from what IP address 51 the content is collected are storable in a setup menu together with the IP addresses 51, as depicted in FIG. 6a. Preferably there can also be programmed how the title 3 is set together.

Preferably the converted text messages 31-34 contain also a headline per text message which is generated from the information data 10 as described hereinafter and connected to the character text of the text message 31-34.

The mobile device 1 shown in FIG. 1 is preferably a smart-phone as e.g. the iPhone from Apple, a Blackberry smart-phone from RIM or any other mobile phone compris-ing a music player function and computing/processing capabilities. But also other systems as mobile device 1 are imaginable as for instance:
 a car infotainment system 105 comprising a music player function, a wireless connectivity function and computing/processing capabilities;
 the PC system 103 preferably being a laptop with said functionalities described above;
 a system of two or more devices which are connected to each other via data exchange, the system comprising a music player which is connectable to a car infotainment system 105 at least by an audio connection cable or via Bluetooth, a data storage device 112, the PC system 103 or parts thereof.

The folder name 2 stands also for a name 2 of a directory, a playlist or the like, and the folder name 2 may have of course also another names as "News", "Emails" "today", "yesterday" or the like.

Figure 2:
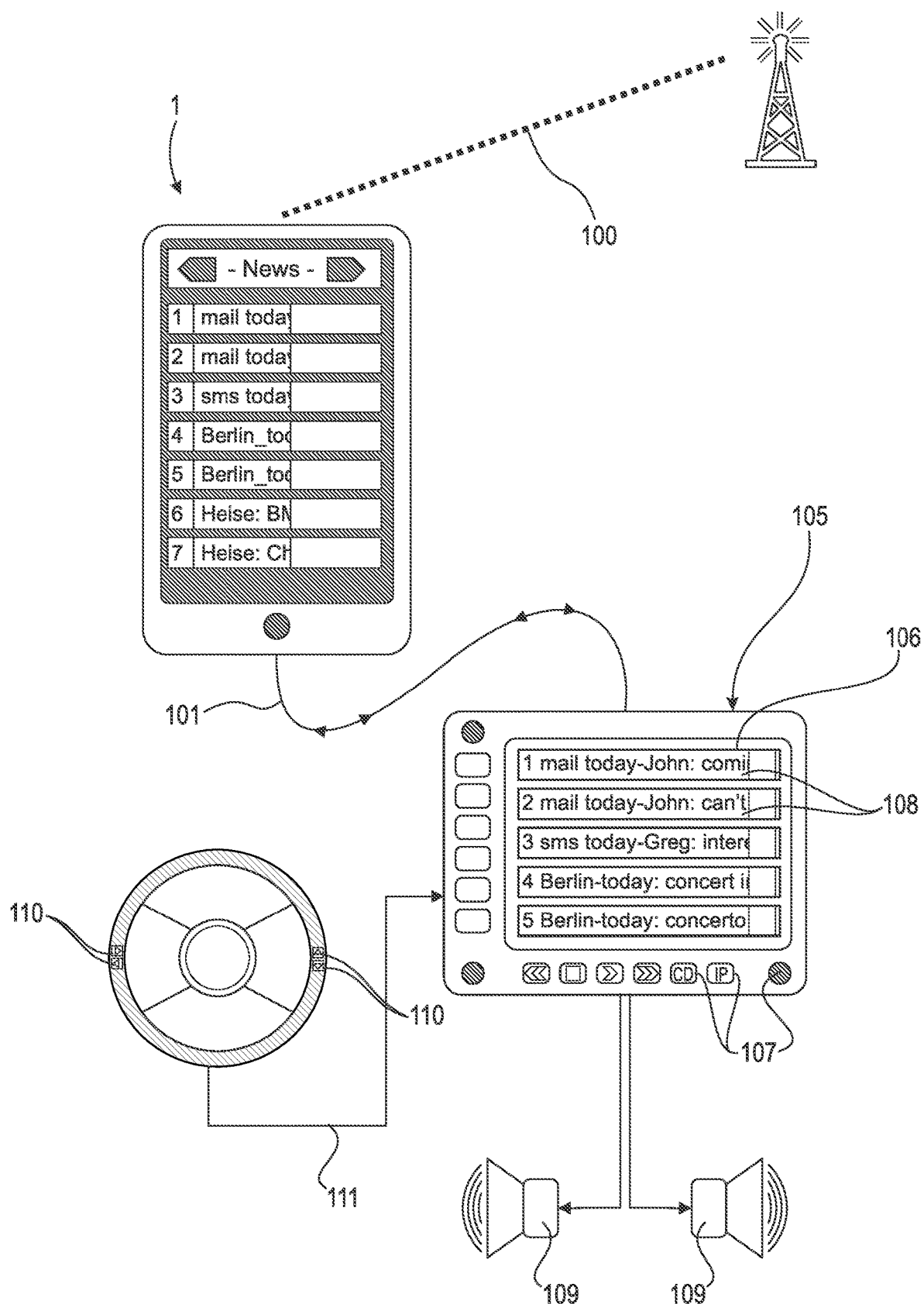
FIG. 2 shows the mobile device connected via the wireless internet connection to the wireless base station and connected via the mobile device connection to a car infotainment system which is connected via a vehicle bus to steering wheel buttons and to loudspeakers.

FIG. 2 shows furthermore the connection between the mobile device 1 and the car infotainment system 105 by a mobile device connection 101. The mobile device connection 101 is preferably a wireless Bluetooth connection, any other wireless connection, or a wired connection for audio and preferably for control or a combination of parts thereof. It is also conceivable that the audio output of the mobile device 1 is led through a RF radio transmitter sending the audio output via radio waves to the car infotainment system 105, wherefore radio-transmitters are already available adapting the audio of nearly any kind of mobile device to the car radio system. Behind the title 108 there is preferably also displayed the length of time 4, for instance in Minutes: Seconds.

On the display screen 106 of the car infotainment system 105 are preferably displayed the titles 108 as copies of the titles 108 shown on the mobile device 1. Either all music and/or audio files of the mobile device 1 are downloaded to the car infotainment system 105 and further managed on the car infotainment system 105 for a selection and playing of one or more audio files, or the display screen 106 shows only the titles 3 of the mobile device 1, whereupon after one title 108 or title 3 is selected for a playing the mobile device 1 plays the selected audio file and the audio message gets sent to the car infotainment system 105 for its amplification and distribution by the connected thereto loudspeakers 109.

With the car infotainment system 105 the respective title 108 or titles 108 can be selected for a playing by any buttons being for example touch screen buttons, buttons 107 of the car infotainment system 105 or by steering wheel buttons 110 which are connected to the car infotainment system 105 via a vehicle bus 111 or wireless. Voice control is also imaginable and common for some car infotainment system 105.

Figure 3:
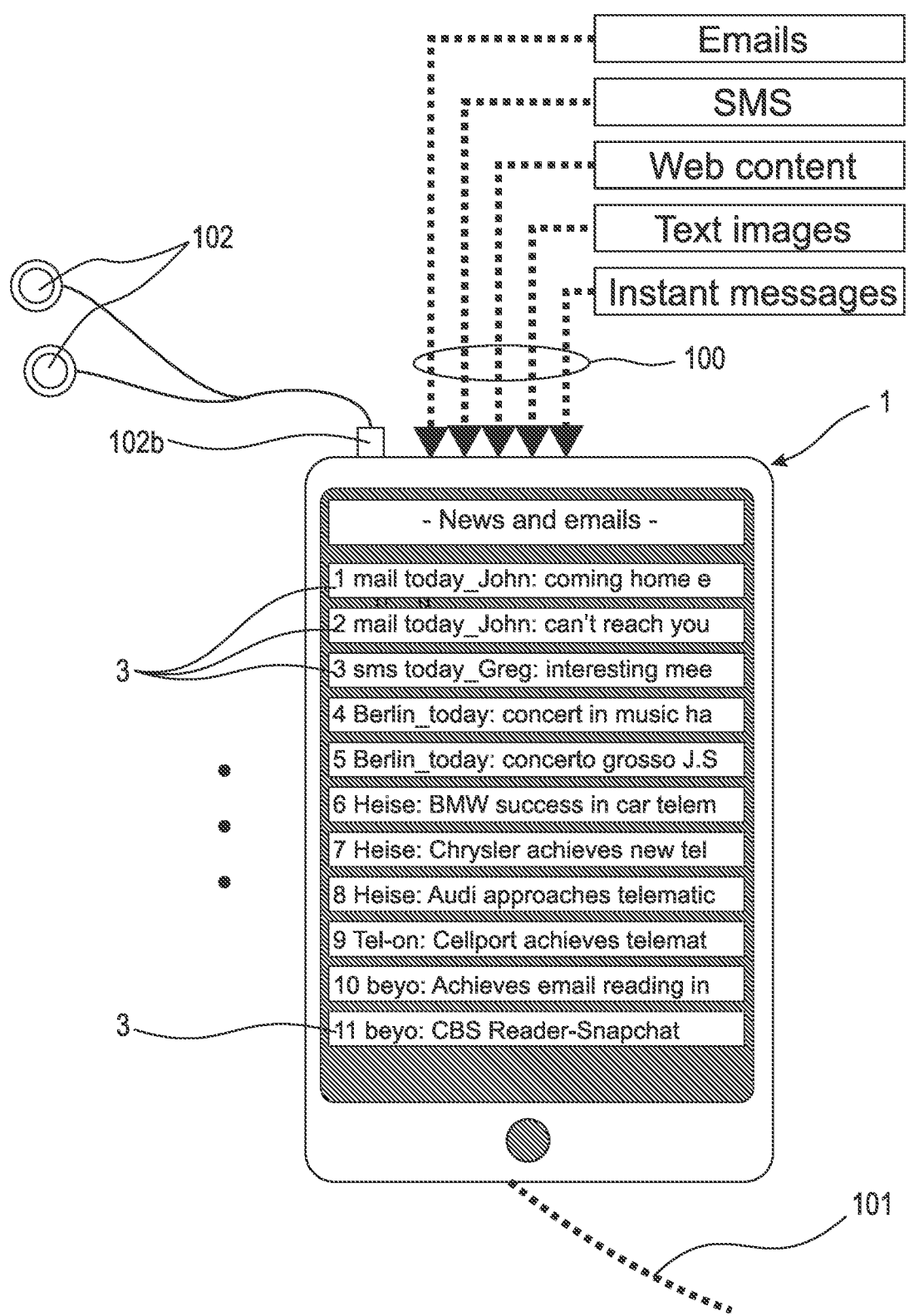
FIG. 3 shows a flow of information data into the mobile device, the information data being emails, SMS messages, Web content and text images.

FIG. 3 is another illustration that various text messages 31-34 may be received by the mobile device 1. Through the wireless internet connection 100 there are received preferably Emails, SMS messages, Web content as for example news or company data, text image data 21-22, social network feeds and instant messages, but it shall not be limited to these.

The wireless internet connection 100 can be the WIFI or a WIMAX or a Bluetooth connection or the like to an internet access point, a GSM/GPRS/EDGE/UMTS or CDMA connection or the like to an email, SMS or internet access provider or it can comprise parts thereof.

It is also imaginable that the mobile device 1 is connected wired or wireless to a PC system 103, as shown in FIG. 1, for the internet connection and/or for a data download to the mobile device 1.

According to the invention one or more IP addresses 51 and/or associated DNS-/URL-addresses are read from a memory which can be an input register connected to a keyboard or a touch screen, an address table, a bookmark table, a register, a database, a data file or the like. The method then executes the processing steps for connecting to the respective IP address 51 and/or the associated DNS-/URL-address and for downloading the respective information data 10 including the one or more text messages 31-34. Following and in sake of a short wording the term "IP address 51" stands always also for "IP address 51 and/or the associated DNS-/URL-address".

FIG. 4a shows an example of the downloaded information data 10 from the IP address 51. The information data 10 preferably contain besides the character text which is relevant for the text message 31-34 also a lot of control commands as for example font and font size, text color, position and background color information, perhaps image data 21-22 and so forth.

The method according to the invention includes a recognizing and extracting of the relevant information which is the character text within the information data 10. The recognition of the character text is preferably processed by parsing for text parts within the information data 10 and taking them in a first step as text blocks 11-20, also excluding all known other control information data 10. In case the information data 10 contain also the image data 21-22 as for example in JPEG or TIFF format or the like, said processing step of recognizing the character text within the information data 10 preferably comprises a conversion of said image data 21-22 to character text data by an OCR software, if that is possible. The obtained character text data is then preferably also taken into account as text blocks 11-20 for a further processing.

Figure 4B:
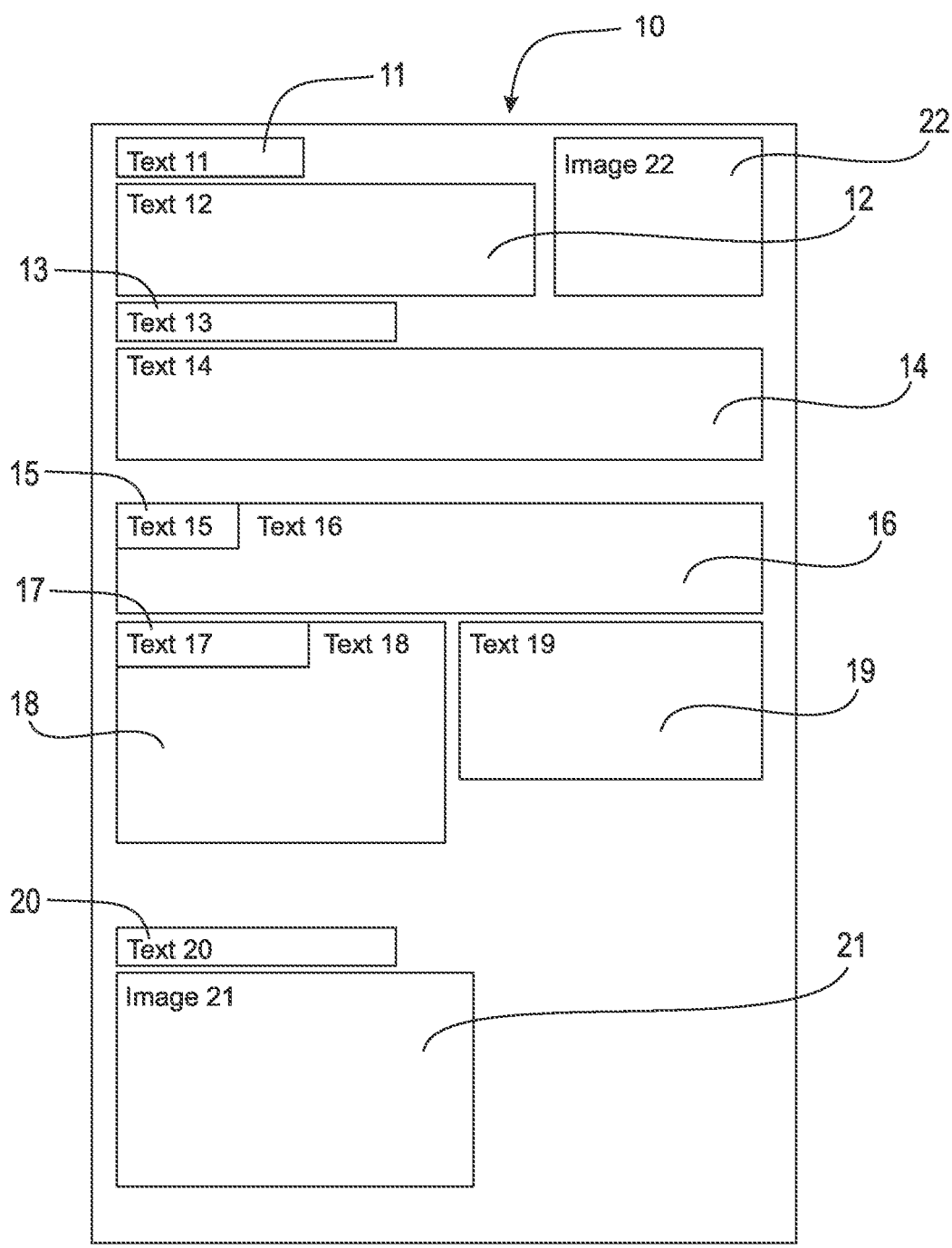
FIG. 4*b* shows recognized character text and images as part of the information data.

FIG. 4b shows a first result of the parsing of the information data 10 obtaining the character text as the text blocks 11-20 and the image data 21-22 which are separated by certain spacing. Preferably, and as mentioned above, the image data 21-22 are also converted to the character text and to the text bocks 11-20, respectively, which are not shown in FIG. 4b.

On the obtained character text there is then applied a text message determination procedure based on a text message determination rule recognizing the at least one text messages 31-34. In a simplest case the text message determination rule takes all the character text of the obtained text blocks 11-20 and puts them together as one text message 31-34.

In a more sophisticated case, the text message determination rule preferably analyzes the information data 10 for a determination of multiple different articles or chapters which are preferably characterized as text blocks 11-20 having a bigger interjacent line spacing to a preceding and to a following text block 11-20 and which comprise preferably a preceding headline 41-44. Herein are preferably also detection characteristics used as detecting bigger or bold letters compared with the rest of the character text, underlined text and so forth.

The determination of the preceding headline 41-44 is based on a headline determination rule which analyses whether the character text of the respective text block 11-20 is only a short sentence, in bold letters, underlined, near to a following text block 11-20 and bigger spaced to a preceding text block 11-20 or parts thereof. FIG. 4b shows as example text blocks 11, 13 and 20 which are in bold and big letters and so are predestined to be with good probability the headlines 41-44 of respective following text blocks 14, 14 and 21. Text blocks 15 and 17 are also in bold letters but are not separated by a different spacing to the following text or by a short sentence and a line break thus making the headline determination and the separation from other chapters/articles more difficult.

A preferred and more sophisticated headline determination rule comprises as well a generation of the respective headline 41-44 for the text block 11-20 or the text message 31-34, respectively, by analyzing the words therein for keywords, for letter size, for underlined words, for statistical occurrence of the words or for parts thereof, also preferably using a keyword reference table. Preferably the headline determination rule may comprise also adding to a first headline text additional text information as for example the source of a text message 31-34 or the information data 10, the IP address 51, the date of the text message 31-34, a keyword being detected within the text message 31-34, a pause or the like. It is also conceivable that the headline determination rule comprises a semantic analysis for the generation of the respective headline 41-44.

Preferably in the setup menu can be selected whether the text message determination rule shall detect within the information data 10 the multiple text blocks 11-20 with headlines 41-44 or multiple text messages 31-34, respectively, or whether all the character text or the text blocks 11-20, respectively, shall be taken as one text message 31-34. Or the detected articles or the chapters can also be seen as multiple text messages 31-34 within a long character text, as for instance a newspaper as the long character text contains the multiple articles as the text messages 31-34. In other words a parameter setting in the setup menu allows preferably whether multiple text messages 31-34, if existing, shall be separated from each other and multiple audio message files, respectively, shall be generated or whether only one audio file shall be generated containing all text messages 31-34 one after the other.

Another preferred sophisticated text message determination rule takes also already processed old previous text messages 31-34 into account, detecting which information is really new or already processed and accepting only new text messages 31-34 and refusing said already processed information.

Figure 6B:
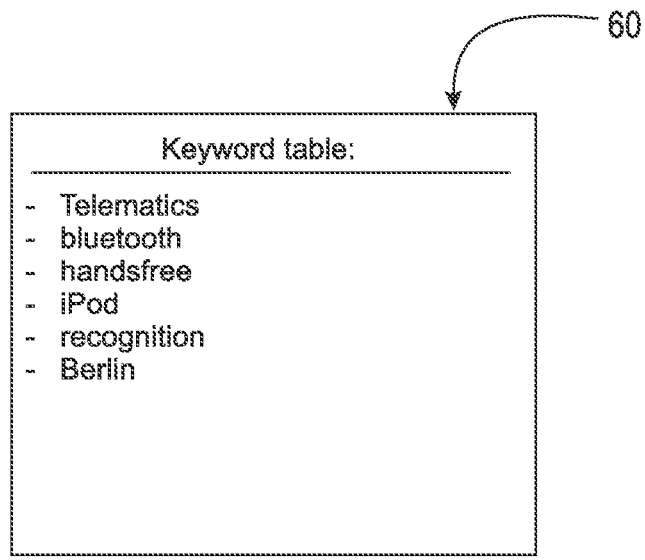
FIG. 6*b* shows a keyword table containing multiple keywords.

Another preferred sophisticated text message determination rule takes into account keywords of a keyword table 60, as shown in FIG. 6b, wherein only those text blocks 11-20 are accepted as relevant text blocks 11-20 which contain at least one of the keywords and wherein the other text blocks 11-20 are refused.

Figure 4C:
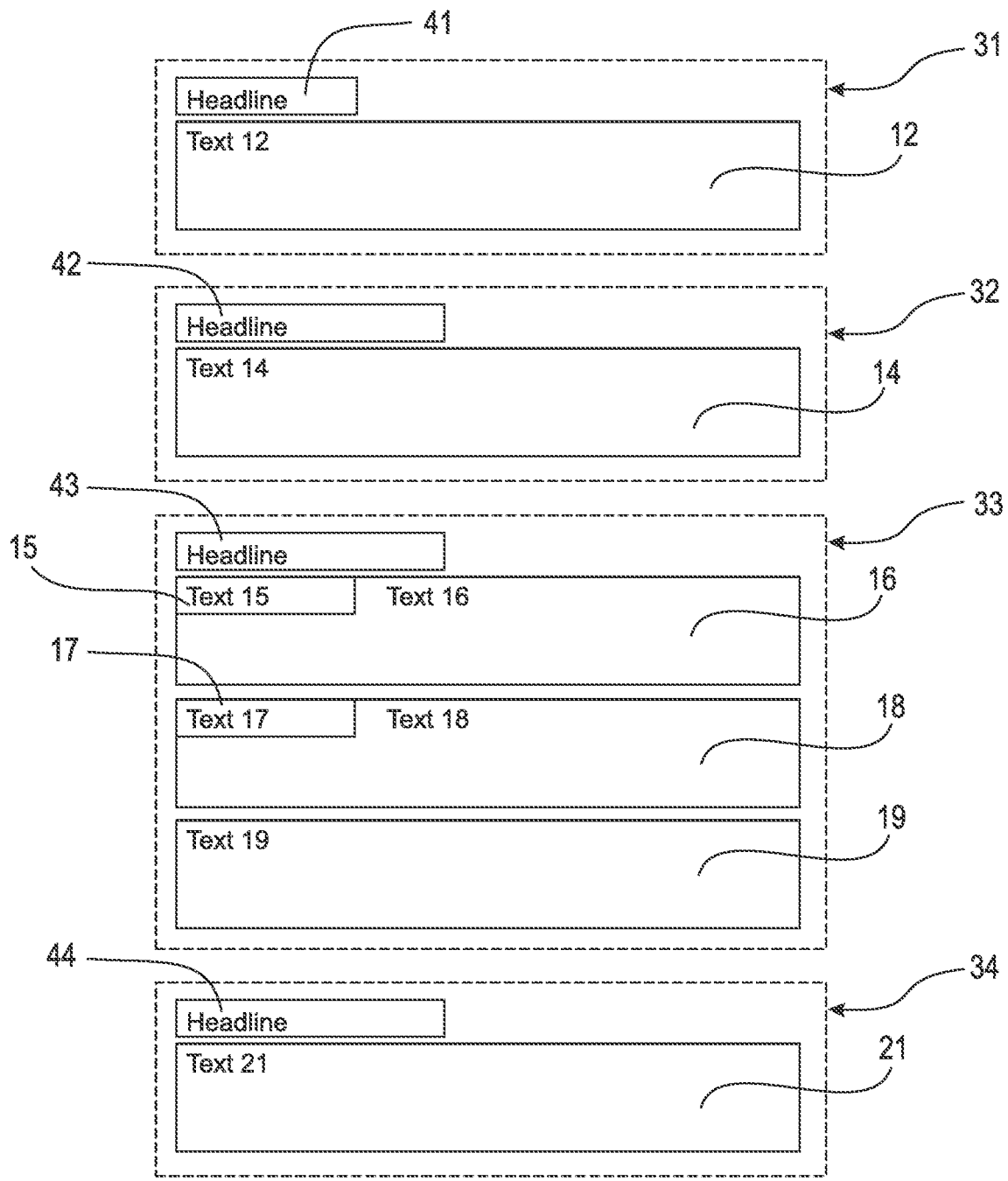
FIG. 4*c* shows determined text messages with respective headlines.

FIG. 4c shows a result after the processing of the determination of the text messages 31-34 and the determination of the headlines 41-44. In this case the set-up was set to generate multiple text messages 31-34 separated from each other, each with a respective headline 41-44. In this example which is based on the information data 10 of FIG. 4a and FIG. 4b the text message 31 contains the headline 41 which is set to be the text block 11, the text block 12 is set to be the original text block 12 as obtained from the previous processing step.

The text block 33 contains the headline 43 which is the result obtained from the headline generation rule in this example generated as a combination of the text blocks 15 and 17 which were in bold letters. The respective character text as informative message is set to be a combination of the text blocks 15,16,17,18 and 19 set one after the other.

Figure 4D:
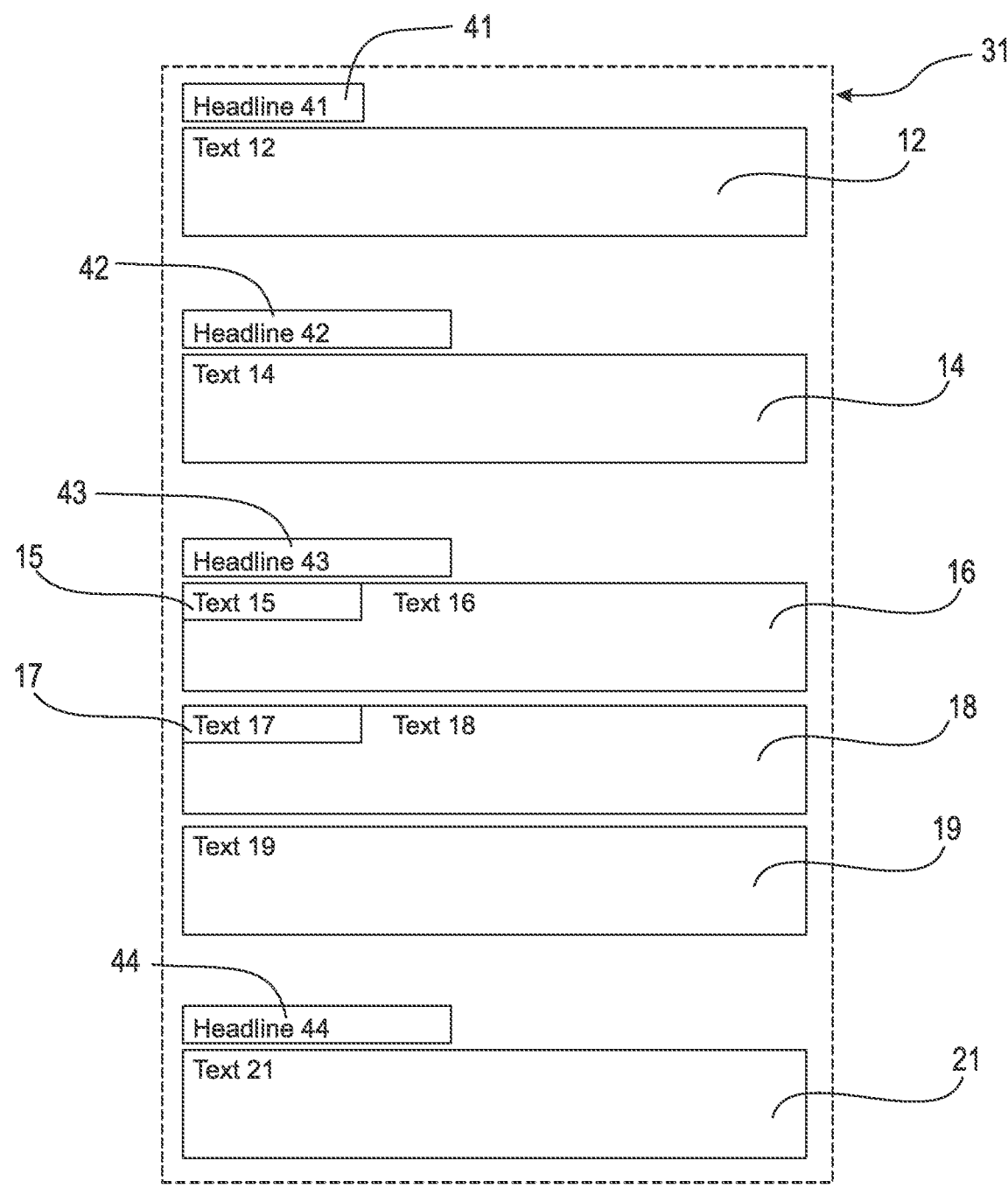
FIG. 4*d* shows another example of one determined text message with respective articles or chapters and with respective headlines.

FIG. 4d shows another example of building the text message 31 of the same information data 10 as of FIG. 4c. In this example the settings in the setup for the determination for the text messages 31-34 are set to build only one text message instead of separating them apart from each other, meaning that all the chapters and the articles detected are put together one after the other, preferably with line breaks or pauses, in between.

Figure 5:
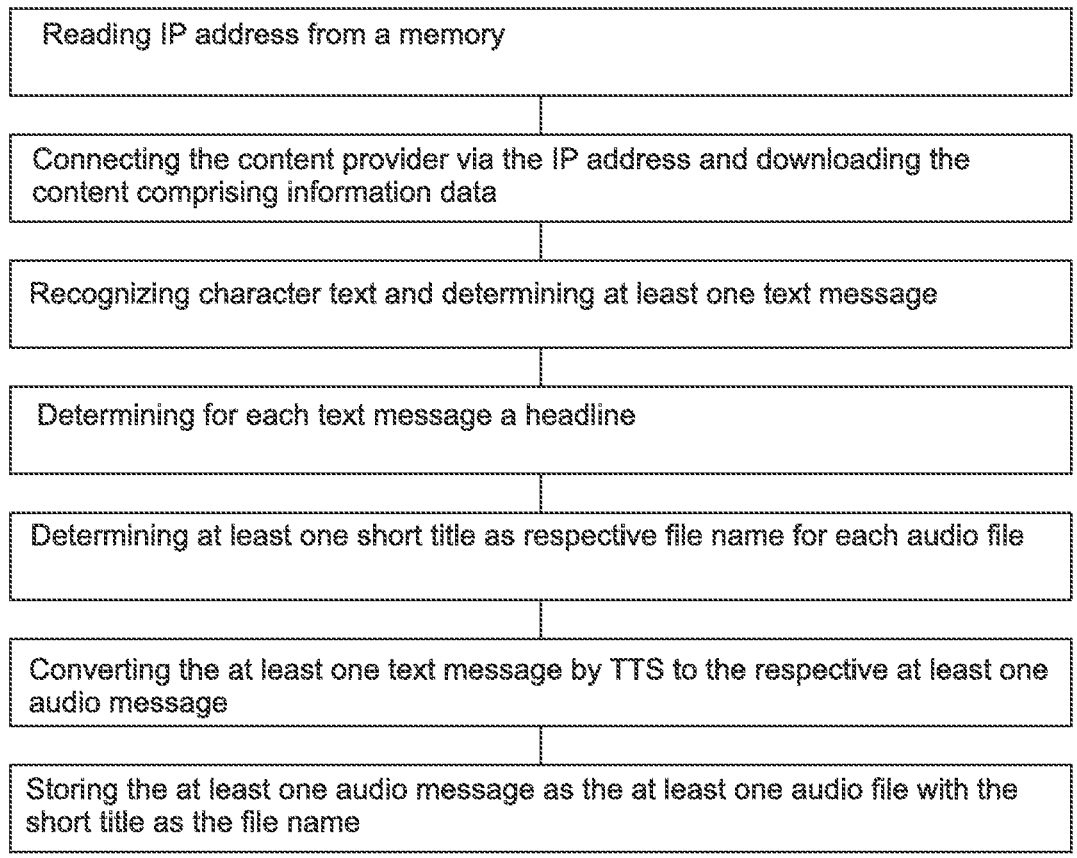
FIG. 5 shows a flow diagram of the main processing steps.

FIG. 5 shows a flow diagram of processing steps of a preferred method according to the present invention. The processing steps according the invention are:

a) Reading the IP address 51 (or the associated DNS-/URL-address) from a memory, wherein the memory is preferably an address table, a bookmark table, a register, a database or a data file containing at least one IP address 51 for an email or SMS server, for the content server of a web-page or for parts thereof. Depending on the settings within the setup, after an execution of this and all the following processing steps preferably all the processing steps get recursively repeated again with a next IP address 51 until a last IP address 51 has been processed.

b) Connecting to the content provider via the IP address 51 and downloading the content from said IP address 51, the content being the information data 10 including the character text. Preferably the connection to the IP address 51 or to the content provider, respectively, is done via the wireless internet connection 100 or the wired mobile device connection 101. Preferably in the setup menu there are also foreseen register settings including a respective login and a respective password for an access to the emails, the instant messages or to the social network feeds.

c1) Recognizing the character text within the information data 10 and determining by the text message determination rule at least one text message 31-34 within the text blocks 11-20.

c2) Preferably determining the headlines 41-44 previous to of each respective article, chapter or text message 31-34.

d) Determining by a short title determination rule at least one short title which is an information related to the at least one text message 31-34 and which is determined for use as the file name for the respective at least one text message 31-34.

In other words, each text message 31-34 will be converted hereinafter by the TTS software to the respective audio message and will be stored as the respective audio file with the respective file name being the respective short title.

Preferably the short title determination rule takes into account characteristics as for example the information source as for example the IP address 51 or the email sender, a short name 52 from a connected address table 50 wherein each IP address 51 is preferably stored together with the connected thereto short name 52 (FIG. 6a), the content and the date of the text message 31-34, the keyword and a content of the respective headline or parts thereof. Other characteristics are also imaginable. Preferably only a limited number of characters of said characteristics are taken and put together, as a resulting short title as the file name can only be displayed with a limited number of characters on the mobile device 1 or on the car infotainment system 105. The purpose of generating the short title or the file name, respectively, is to give the user or driver understandable information what the respective audio file is about. In this context it is also conceivable, that the email or SMS messages of one day get enumerated with a respective appendix being an incremented number.

e) Converting the at least one text message 31-34 by a Text-to-Speech software (TTS) to the respective at least one audio message. This means that the character text as e.g. Unicode or Ascii text or the like gets converted to audio data by the TTS software obtaining the audio data in pcm format or the like. The obtained audio data or the like are then preferably stored as the audio file in a data format as e.g. PCM, MP3, WAV, OggVorbis, Apple iPod/iPhone format, WMA, MPEG, one of the ITU-T standard formats, A-law, .mu.-law and the like.

The purpose of choosing an appropriate audio file format is that it is playable on the mobile device 1 or on the car infotainment system 105, respectively.

f) Storing the respective at least one audio message or the audio file, respectively, as the at least one audio file with the respective short title as the file name. Preferably the one or more audio files get stored on the mobile device 1 or on the car infotainment system 105 comprising functionalities as the mobile device 1. But it is also imaginable to execute steps a)-f) on the PC system 103, storing the one or more audio files on an internal memory for the PC system 103 and to transfer the one or more audio files via a storage device 112 as e.g. a SD-card, an USB-stick or the like to the mobile device 1 or to the car infotainment system 105, respectively. It is also imaginable to transfer the one or more audio files from the PC system 103 to the mobile device 1 or to the car infotainment system 105 wireless or via a data cable connection or to send them through the internet to a server system for download to the mobile device 1 or to the ear infotainment system 105.

Storing the audio files preferably also includes knowledge in which folder, album, playlist, directory or the like the respective audio file gets stored, also regarding the content, the source, the sender or the like of the audio file.

This knowledge is preferably processed by a file storage rule which is preferably programmable by the Setup menu where the user can select where and how which kind of audio files shall be stored. For example, preferably it is programmable where new audio files concerning text messages 31-34, new audio files concerning SMS, new audio files concerning news, audio files already played and the like are to be stored or dragged. It is even imaginable that a new folder or the like is created if it did not exist before in case of an incoming first email.

g) Enabling the selection of one or more of said audio files for playing either on the mobile device 1 or on a connected thereto device as the car infotainment system 105 or the like.

FIG. 6a gives a preferred example of the address table 50 containing the IP addresses 51 with additional respective short names 52 for the respective IP addresses 51. Those IP addresses 51 with respective short names 52 are preferably accessible and can be input, changed or deleted in the setup menu.

FIG. 6b shows a preferred example of the keyword table 60 containing multiple keywords. Those keywords are preferably accessible and can be input, changed or deleted in the setup menu.

Figure 7:
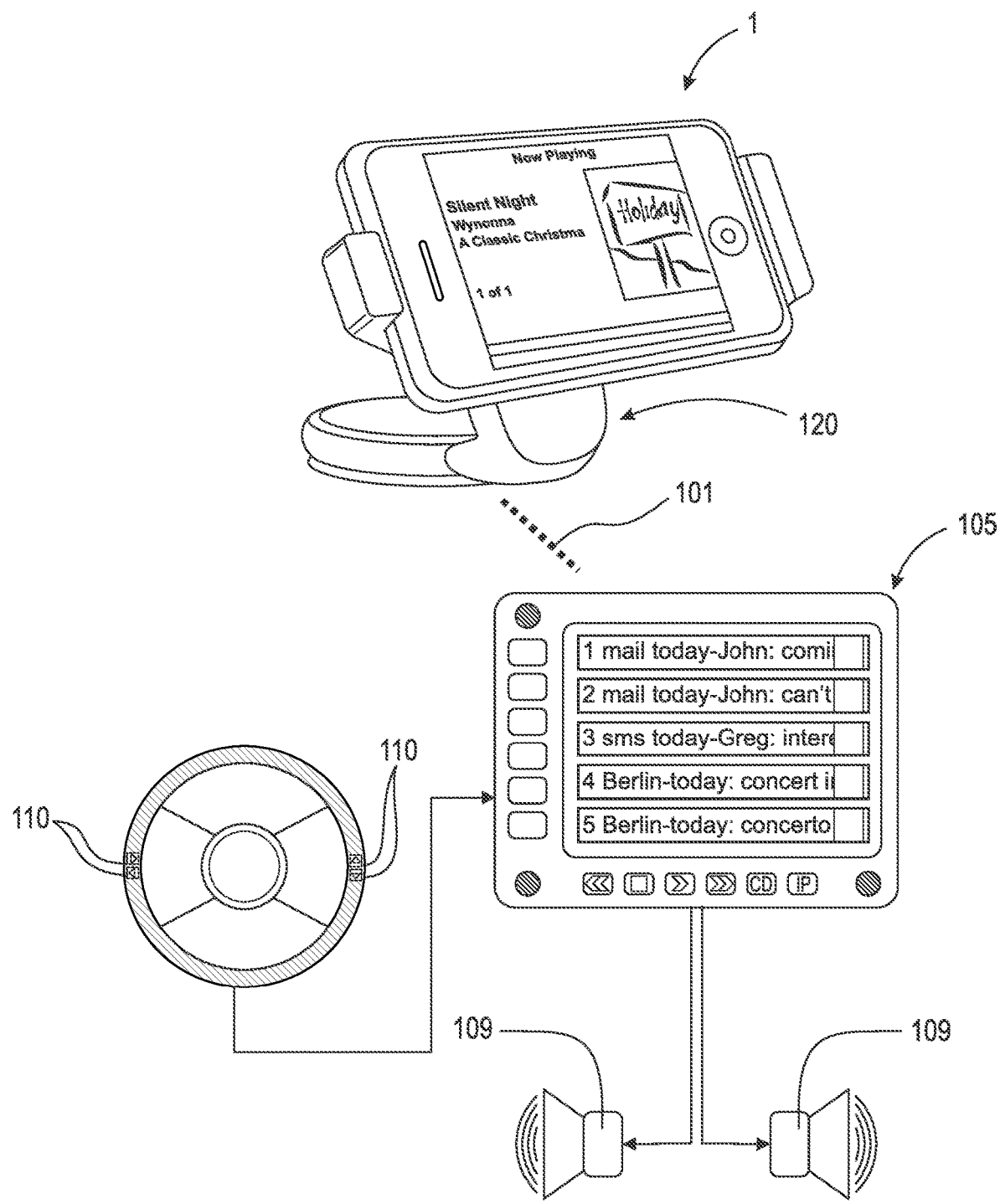
FIG. 7 shows a setup of the mobile device being held in a holder/cradle and the connected thereto car infotainment system with loudspeakers and steering wheel buttons.

FIG. 7 shows a preferred example of the holder/cradle 120 which holds the mobile device 1 in a car environment. Further functionalities can be a charging of the mobile device 1 or an interface connecting between the mobile device 1 and the car radio or the ear infotainment system 105, respectively, via the mobile device connection 101. In another preferred embodiment the holder/cradle 120 also comprises a radio transmitter transmitting the connected audio signal of the mobile device 1 as e.g. a FM electromagnetic wave which is receivable with a FM radio receiver in the car. Another preferred embodiment of the holder/cradle 120 comprises a data interface to mobile device 1 which can comprise audio and/or control data, and the holder/cradle 120 comprises as well an interface to the car infotainment system 105 or the like, the interface to the car infotainment system 105 comprising also audio and/or control data, wherein the holder/cradle 120 preferably comprise an interface adaption functionality between the mobile device 1 and the car infotainment system 105. Additionally a part or the whole data exchange between the mobile device 1 and the car infotainment system 105 may be done via a vehicle bus 111, as e.g. a CAN bus or the like. It is also imaginable that the mobile device 1 sends the audio data directly to the car infotainment system 105 wired or wireless.

Figure 8:
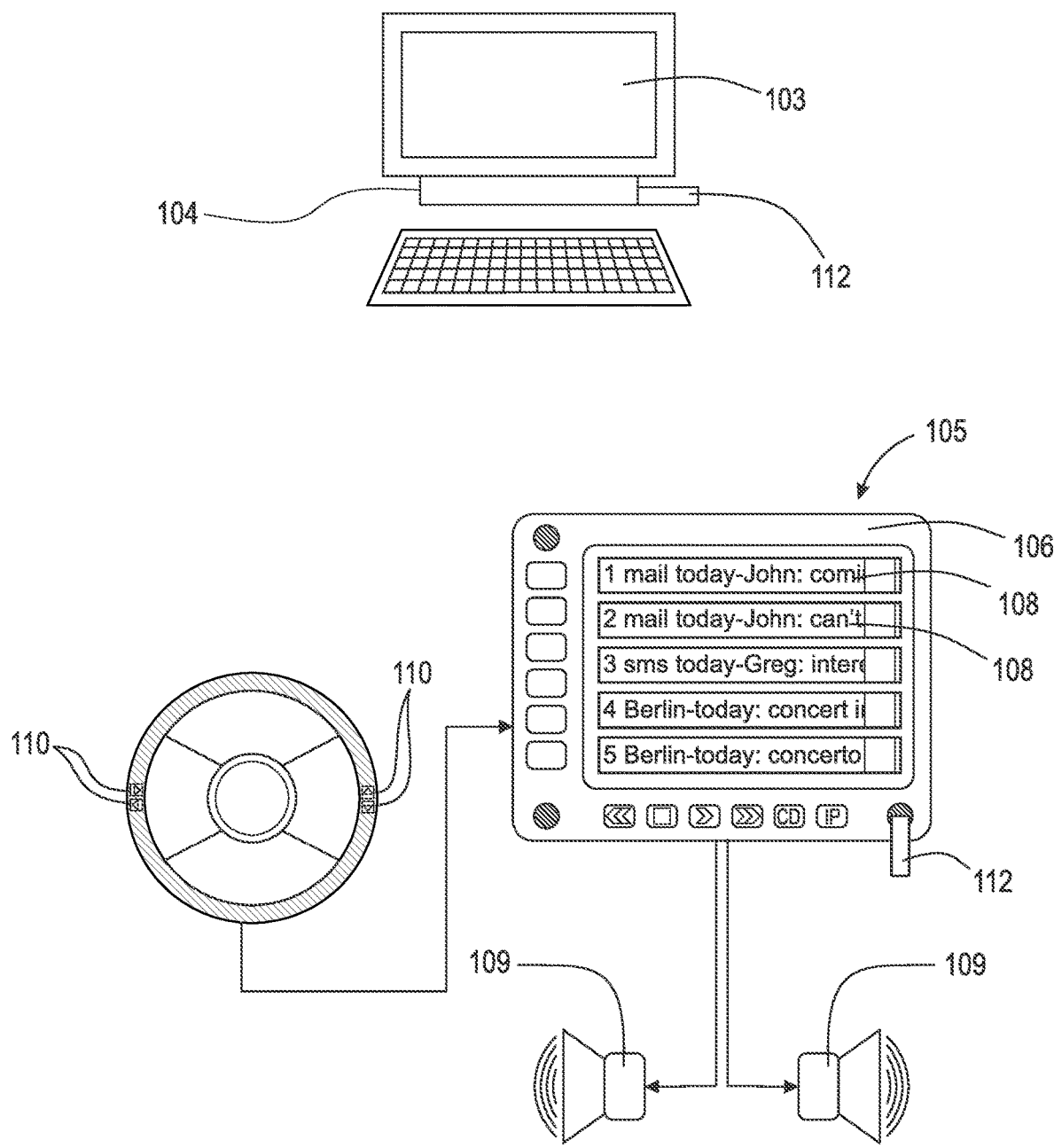
FIG. 8 shows the PC system with a data storage device connected thereto and it shows below the car infotainment system with the data storage device.

FIG. 8 shows a preferred embodiment wherein preferably all the processing steps of the present invention up to the storing of the one or more audio files are executed by the PC system 103 having the internet connection 104, and wherein the one or more audio files are stored on or copied to the data storage device 112. The data storage device 112 is preferably the SD card, the USB stick or the like, the music player with data storage capabilities, the mobile device 1 or the like. It is also imaginable to use the car infotainment system 105 as data storage device 112 if a wireless connection is set up. Another preferred embodiment foresees that the data storage device 112 is a part of a server system accessible via the internet, where the audio files can be downloaded to the mobile device 1 or the car infotainment system 105 or the like, respectively.

The lower part of FIG. 8 shows the data storage device 112 connected to the car infotainment system 105 and the titles 108 on the display 106 of the car infotainment system 105.

Another preferred method according to the present invention and in case a new audio file was generated and stored furthermore comprises a generation of an audio signal and/or displays a message on the display with the mobile device 1 and/or with the car infotainment system 105. Herein it is also imaginable that the generation of the audio signal and/or by the displayed message only occurs if a respective determination rule detects a certain keyword or a sender address or the like which is preferably programmable within the setup menu. A preferred further processing interrupts a current music playing on the mobile device 1 or on the car infotainment system 105 indicating that a new message is received and converted, ready for playing/reading.

Another preferred method according to the present invention furthermore comprises that after the information data 10 are downloaded under a certain IP address 51 the information data 10 get analyzed for the recognition of the text messages 31-34 as well as for one or more other IP addresses contained in the information data 10, wherein the one or more other IP addresses are web-links within, before or after the respective text message 31-34. Preferably the one or more other IP addresses get stored in the IP address table 50 or in a volatile memory, wherefrom the other IP addresses are read out after all processing steps connected to the current IP address 51 are executed. This recursive procedure, of recognizing text messages 32-34 preferably containing certain keywords and recognizing as well web-links being IP addresses within the downloaded information data 10, proceeding with the recursive connection to the web-links and recognizing therein the following text messages 31-34 and web-links, is a kind of a recursive or linked search for information containing one or more keywords. In other words, said preferred recursive procedure allows to connect to one of the IP addresses 51 for the content provider, to recognize the text messages 31-34 preferably containing one of the keywords, to recognize next web-links connected to the text messages 31-34, to convert the text messages 31-34 to the audio messages and to search for and recognize further text messages 31-34 and web-links within the information data 10 of the next web-links. Preferably the keywords are either taken from the keyword table 60 or from another keyword table connected to the respective IP address.

Preferably the method of finding the text messages 31-34 and the web-links comprises also a semantic keyword search analysis, which detects for example on a search for the keyword "vehicle" also the semantically connected words "car", "automobile", "truck", "SUV" or the like and recognizes the respective articles or text messages 31-34, respectively.

A preferred method undertakes the search for articles under the same keyword search procedure as described above, wherein the first IP address 51 is connected to a search machine as for example Google, Bing, Yahoo, Heise-online or the like. As the downloaded information data 10 comprise mainly other IP addresses being web-links found under a certain keyword for what was searched for, the recognition of the text messages 31-34 is mainly achieved via the web-links.

Preferably said method of recursive search under web-links within the information data 10 is initiated by a first IP address, by respective keywords connected to the first IP address and preferably by a time interval for restarting the recursive search again and again. Preferably the first IP address, the respective keywords and the time interval is stored in a register table and organized by a respective bookmark or spider agent. Said register table or the entries, respectively, are preferably manageable and editable in a certain part of the Setup. Preferably for each of the one or more first IP addresses there are connected the respective one or more keywords and time intervals.

Another preferred method according to the present invention furthermore comprises processing steps of capturing an image with a camera of the mobile device 1 or connected the PC system 103 of a paper document containing character text and converting the image data 21-22 of the captured image via the optical character recognition (OCR) software to character text. The character text is then taken as information data 10 continuing with the processing steps as described above. The advantageous aspect for drivers spending a lot of their time in cars is the provision of simply capturing one or more images of text pages or newspapers, of converting the image data 21-22 to text messages 31-34, and of converting and storing to audio messages as audio files for the selection and playing of the audio files as desired.

Another preferred method according to the present invention furthermore comprises a control function detecting a selection and playing of a control audio file with a unique file name which is setup as one of the audio or music files only in order to detect its selection and playing. For the detection of the playing of the control audio file only the unique file name of the control audio file is relevant, the content of the control audio file is of no relevance but preferably contains a short audio message what will be executed thereupon. Preferably the control function is a software routine running in parallel to the music player, executing by "polling" or with a certain frequency the detection whether the control audio file is played. In case the playing of the control audio file is detected the control function initiates another process or executes another function, preferably the control function initiates the connection to the IP address connected to the control audio file, downloads the respective information data 10 continuing with the recognition of the text messages 31-34 and the generation of the respective audio file. In other words the playing of the control audio file initiated by the user gets detected and initiates the execution of the processing steps described before, as e.g. connecting to a certain IP address, downloading the information data 10, recognizing the text messages 31-34 and so forth according to FIG. 5. Preferably in the Setup menu to each of the control audio files is assigned an respective IP- or DNS-/URL-address, so that each control audio file initiates a determined function. So one or more IP addresses in the memory and preferably connected keywords thereto are in said case also assigned to respective control audio files. It is also conceivable to control by such control audio files other functions, as e.g. email download, starting a phone call under a certain phone number assigned to the respective control audio file, sending an SMS message stored with the respective phone number and assigned to the respective control audio file or the like. Preferably the unique file names are short and descriptive for the function and contain one or more special characters.

The main advantage of said control by such one or more control audio files is the control of the mobile phone 1 via a wide spread data protocol for the selection and playing of music files via the infotainment system 105 or the like.

Furthermore, although the present invention has been described in connection with certain specific embodiments and preferred processing steps, the present invention is not limited thereto.

Accordingly various modifications, adaptations and combinations of various features of the described embodiments and processing steps can be practiced without departing from the scope of the present invention as set forth in the accompanying claims.

Where technical features mentioned in any claim are followed by reference signs, those reference signs have been included just for the sole purpose of increasing intelligibility of the claims and accordingly, such reference signs do not have any limiting effect on the scope of each element identified by way of example by such reference signs.

LIST OF REFERENCE NUMERALS

1 mobile device
2 folder name
3 Title
4 length of time
10 information data (=content)
11-20 text blocks (containing character text)
21,22 image data
31-34 text messages
41-44 headline
50 address table
51 IP address
52 short name for the IP address
60 keyword table
100 wireless internet connection
101 mobile device connection
102 ear plugs
102*b* audio connector
103 PC system
104 internet connection
105 car infotainment system
106 display screen
107 buttons
108 titles
109 loudspeakers
110 steering wheel buttons
111 vehicle bus (CAN bus or the like)
112 data storage device
120 holder/cradle (for mobile device)

What is claimed is:

1. A computing system for audibly providing character text, the computing system comprising:
a processor; and
a memory with computer code instructions stored thereon, the processor and the memory, with the computer code instructions, causing the computing system to audibly provide character text by:
determining a title based on at least a portion of character text, the determining the title including identifying text in the title from (i) text content within the portion of the character text and (ii) text characteristics of words within at least the portion of the character text;
converting at least the portion of the character text to an audio message;
displaying the determined title in a graphical user interface (GUI); and
directing the audio message to play in response to selection of the displayed title, wherein the selection of the displayed title is performed via a mobile device or a car infotainment or audio system, and wherein at least one of:
(i) the text characteristics include at least one of word size and underline; and
(ii) the computing system communicates with the car infotainment or audio system via a directly wired connection or wirelessly and via an adaptor, wherein the adaptor comprises a communication interface and a communication link to the car infotainment or audio system, wherein the communication link is a separate wire or is a controller area network (CAN) bus or another vehicle bus.

2. The system of claim 1 wherein the processor and the memory, with the computer code instructions, are further configured to cause the system to:
obtain the character text from a content provider.

3. The system of claim 2 wherein, in obtaining the character text, the processor and the memory, with the computer code instructions, are further configured to cause the system to:
download the character text from the content provider via an IP address or a DNS-/URL-address associated with the content provider.

4. The system of claim 1 wherein the processor and the memory, with the computer code instructions, are further configured to cause the system to:
determine at least one headline, the at least one headline informing a listener at a beginning of playing the audio message about a source of the character text.

5. The system of claim 4 wherein, in determining the at least one headline, the processor and the memory, with the computer code instructions, are further configured to cause the system to take into account at least one of: an IP address associated with the source, a DNS-/URL-address associated with the source, a character string of a database table assigned to the IP address or to the associated DNS-/URL-address, and the text characteristics of the words within the portion of the character text.

6. The system of claim 1 wherein the processor and the memory, with the computer code instructions, are further configured to cause the system to:

store the audio message using the determined title as a file name.

7. The system of claim 6 wherein, in storing the audio message, the processor and the memory, with the computer code instructions, are configured to cause the system to store the audio message in at least one of the following standard music data file formats: MP3, WAV, OggVorbis, iPhone, Apple iPod format, WMA, PCM or an ITU-T standard.

8. The system of claim 1 wherein the processor and the memory, with the computer code instructions, are further configured to cause the system to:
obtain image data of a paper document; and
convert the image data via optical character recognition to the character text.

9. The system of claim 1 wherein the selection of the displayed title is performed via the mobile device or the car infotainment or audio system in a same manner as music data files.

10. The system of claim 1 wherein, in determining the title, the processor and the memory, with the computer code instructions, are further configured to cause the system to take into account a number of characters capable of being displayed in the GUI.

11. A computer implemented method for audibly providing character text, the method comprising:
determining a title based on at least a portion of character text, the determining the title including identifying text in the title from (i) text content within the portion of the character text and (ii) text characteristics of words within at least the portion of the character text;
converting at least the portion of the character text to an audio message;
displaying the determined title in a graphical user interface (GUI); and
directing the audio message to play in response to selection of the displayed title, wherein the selection of the displayed title is performed via a mobile device or a car infotainment or audio system, and wherein at least one of:
 (i) the text characteristics include at least one of word size and underline; and
 (ii) the computer communicates with the car infotainment or audio system via a directly wired connection or wirelessly and via an adaptor, wherein the adaptor comprises a communication interface and a communication link to the car infotainment or audio system, wherein the communication link is a separate wire or is a controller area network (CAN) bus or another vehicle bus.

12. The method of claim 11 further comprising:
downloading the character text from a content provider via an IP address or a DNS-/URL-address associated with the content provider.

13. The method of claim 11 further comprising:
obtaining image data of a paper document; and
converting the image data via optical character recognition to the character text.

14. The method of claim 11 further comprising:
determining at least one headline, the at least one headline informing a listener at a beginning of playing the audio message about a source of the character text, wherein determining the at least one headline takes into account at least one of: an IP address associated with the source, a DNS-/URL-address associated with the source, a character string of a database table assigned to the IP address or to the associated DNS-/URL-address, and the text characteristics of the words within the portion of the character text.

15. The method of claim 11 wherein determining the title takes into account a number of characters capable of being displayed in the GUI.

16. A computer program product for audibly providing character text, the computer program product comprising:
one or more computer-readable tangible storage devices and program instructions stored on at least one of the one or more storage devices, the program instructions, when loaded and executed by a processor, cause an apparatus in communication with the processor to audibly provide character text by:
determining a title based on at least a portion of character text, the determining the title including identifying text in the title from (i) text content within the portion of the character text and (ii) text characteristics of words within at least the portion of the character text;
converting at least the portion of the character text to an audio message;
displaying the determined title in a graphical user interface (GUI); and
directing the audio message to play in response to selection of the displayed title, wherein the selection of the displayed title is performed via a mobile device or a car infotainment or audio system, and wherein at least one of:
 (i) the text characteristics include at least one of word size and underline; and
 (ii) the processor communicates with the car infotainment or audio system via a directly wired connection or wirelessly and via an adaptor, wherein the adaptor comprises a communication interface and a communication link to the car infotainment or audio system, wherein the communication link is a separate wire or is a controller area network (CAN) bus or another vehicle bus.

* * * * *